United States Patent
Batra et al.

(10) Patent No.: US 12,533,302 B2
(45) Date of Patent: Jan. 27, 2026

(54) SYSTEMS AND METHODS FOR DELIVERY OF ACTIVES AND HEALING TISSUE

(71) Applicant: Vias Partners, LLC, Doylestown, PA (US)

(72) Inventors: Amy Billups Batra, New Hope, PA (US); Jaya Krishna Rose Batra, New Hope, PA (US); Sanjay Batra, New Hope, PA (US)

(73) Assignee: Vias Partners, LLC

( * ) Notice: Subject to any disclaimer, the term of this patent is extended or adjusted under 35 U.S.C. 154(b) by 0 days.

(21) Appl. No.: 17/683,813

(22) Filed: Mar. 1, 2022

(65) Prior Publication Data

US 2022/0304902 A1  Sep. 29, 2022

Related U.S. Application Data

(60) Provisional application No. 63/155,234, filed on Mar. 1, 2021.

(51) Int. Cl.
| | | |
|---|---|---|
| *A61Q 19/08* | (2006.01) | |
| *A61K 8/02* | (2006.01) | |
| *A61K 8/04* | (2006.01) | |
| *A61Q 19/00* | (2006.01) | |

(52) U.S. Cl.
CPC ............ *A61K 8/0212* (2013.01); *A61K 8/042* (2013.01); *A61Q 19/00* (2013.01); *A61Q 19/08* (2013.01)

(58) Field of Classification Search
CPC ...... A61K 8/0212; A61K 8/042; A61K 8/731; A61K 8/733; A61K 8/8147; A61K 8/8176; A61K 8/8182; A61K 8/86; A61Q 19/00; A61Q 19/08
See application file for complete search history.

(56) References Cited

U.S. PATENT DOCUMENTS

| | | | |
|---|---|---|---|
| 2,973,282 | A | 2/1961 | Gross |
| 3,307,544 | A | 3/1967 | Gander et al. |
| 7,470,656 | B2 * | 12/2008 | Sherry et al. ........... C11D 17/00 |
| | | | 510/438 |
| 8,372,130 | B2 | 2/2013 | Young |
| 8,927,605 | B2 | 1/2015 | Subkowski et al. |
| 10,448,727 | B2 | 10/2019 | Ito et al. |
| 2003/0167556 | A1 | 9/2003 | Kelley |
| 2005/0074482 | A1 * | 4/2005 | Goldman ................ A61L 15/58 |
| | | | 424/443 |
| 2006/0015083 | A1 * | 1/2006 | Munro et al. ........... A61F 13/15 |
| | | | 604/367 |
| 2007/0087061 | A1 * | 4/2007 | Drake et al. ........... A61K 35/14 |
| | | | 424/532 |
| 2011/0208101 | A1 * | 8/2011 | Keller ............... A61F 13/01017 |
| | | | 602/44 |
| 2013/0084305 | A1 * | 4/2013 | Iwama .................. A61K 31/715 |
| | | | 424/195.18 |
| 2014/0235727 | A1 * | 8/2014 | Tufts ..................... A61L 26/008 |
| | | | 514/635 |
| 2020/0170381 | A1 * | 6/2020 | Park ..................... A45D 44/002 |

FOREIGN PATENT DOCUMENTS

CN   108853713 A   11/2018

OTHER PUBLICATIONS

Fathi-Azarbayjani (AAPS PharmSciTech, vol. 11, No. 3, Sep. 2010, p. 1164-1170) Novel Vitamin and Gold-Loaded Nanofiber Facial Mask for Topical Delivery (Year: 2010).*
Hettiaratchi et al. (APL Bioengineering 2, 026110 (2018) A rapid method for determining protein diffusion through hydrogels for regenerative medicine applications (Year: 2018).*
Axpe et al. (Macromolecules pubs.acs.org/Macromolecules 2019, 52, 6889-689) A Multiscale Model for Solute Diffusion in Hydrogels (Year: 2019).*
Potts and Francoeur, "The Influence of Stratum Corneum Morphology on Water Permeability" Journal of Investigative Dermatology vol. 96, Issue 4, Apr. 1991, pp. 495-499 (Year: 1991).*
Thomas et al. ("Hydrophilic-hydrophobic hydrogels for cartilage replacement" Journal of the Mechanical Behavior of Biomedical Materials vol. 2, Issue 6, Dec. 2009, pp. 588-595) (Year: 2009).*
A. Batra (https://maskad.co/products/hydrogel-infusion-face-mask?srsltid=AfmBOoqfLuqahGN-W1EDMt4aQMMLJJqmWsBfs73KVsfTIEpjBjXY2C0s; pub. Jan. 26, 2024, see bottom video), (Year: 2024).*
Pan et al. "Multifunctional Superhydrophobic Surfaces Templated From Innately Microstructured Hydrogel Matrix" (ACS Nano Lett., 14, 4803-4809, pub. Jun. 30, 2014) (Year: 2014).*
Larrañeta et al. "Hydrogels for Hydrophobic Drug Delivery. Classification, Synthesis and Applications" (J. Funct. Biomater., 9, 13, pub. Jan. 24, 2018) (Year: 2018).*

* cited by examiner

*Primary Examiner* — Ali Soroush
*Assistant Examiner* — Karen Ketcham
(74) *Attorney, Agent, or Firm* — The Belles Group, P.C.

(57) ABSTRACT

Described herein are delivery systems comprising a deformable substrate comprising a hydrophobic surface; an active ingredient; wherein all of the active ingredient is on said hydrophobic surface; a hydrogel and water; along with methods of using and making same. The delivery systems are designed to deliver active ingredients to and through the skin surface.

13 Claims, 5 Drawing Sheets

SYSTEMS AND METHODS FOR DELIVERY OF ACTIVES AND HEALING TISSUE

CROSS-REFERENCE TO RELATED APPLICATION

This application claims the benefit of priority from U.S. Provisional Application No. 63/155,234, filed Mar. 1, 2021, the contents of which are hereby incorporated herein in their entirety.

BACKGROUND

The use of facial sheet masks as part of a beauty regimen has increased in popularity over the last few years. However, currently available masks are typically wet to the touch, which makes them messy to apply; and limits their capability to deliver active ingredients. Further, wet masks often require an over-abundance of preservatives and other ingredients that may be harmful to the skin; and they are generally unable to accelerate tissue healing. Another issue presented by currently available masks is their inability to properly fit the contours of a human face. As such, there remains a need for masks which—inter alia: a) are not messy when applied; b) can deliver an active ingredient; c) aid in recovery of damaged tissue; d) are substantially free of harmful ingredients, including preservatives; and e) properly fit the contours of a human face. Certain embodiments of the present invention are designed to meet these, and other, needs.

SUMMARY

Some embodiments of the present invention provide a delivery system comprising: a deformable substrate comprising: a hydrogel comprising: a polymeric component; and water; wherein the polymeric component and water are present in a ratio of from about 1:5 to about 1:1, optionally from about 1:4 to about 1:2, further optionally about 1:3.

Other embodiments of the present invention provide a mask for delivery of an ingredient to a facial surface of a mammalian subject comprising: a flexible substrate comprising a non-woven material; an ingredient selected from: a filler; a neuromodulator; a cooling agent; an antimicrobial agent; an anti-inflammatory agent; an anti-aging compound; a biological material (e.g. platelet-rich plasma or growth factors); and a combination of two or more thereof; wherein the flexible substrate has at least one hydrophobic surface.

Further embodiments of the present invention provide a method of treating a skin surface, comprising: applying a delivery system comprising: a backing layer; a protective layer; and a deformable substrate comprising: a hydrogel comprising: a polymeric component; and water; wherein the polymeric component and water are present in a ratio of from about 1:5 to about 1:1, optionally from about 1:4 to about 1:2, further optionally at about 1:3, to a skin surface of a mammal in need thereof.

DETAILED DESCRIPTION

Figure 1A:
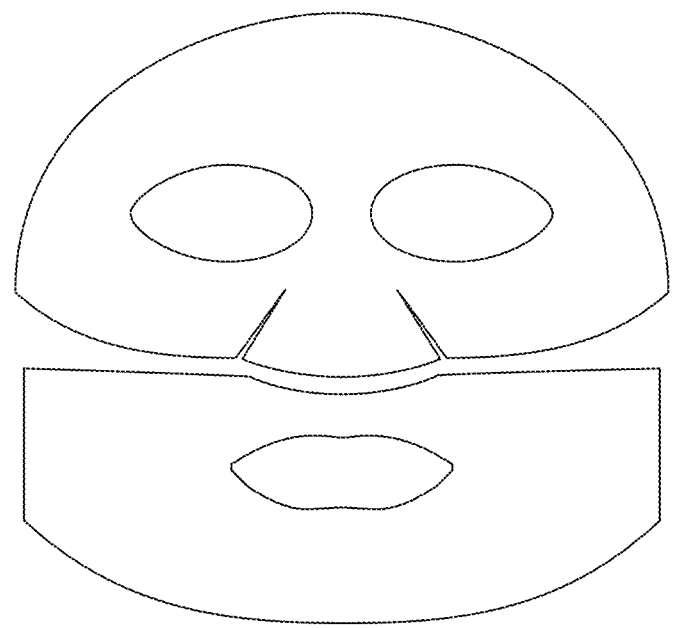
FIG. 1A and FIG. 1B depict the dimensions and specification for an exemplary delivery system of the present invention.

For illustrative purposes, the principles of the present invention are described by referencing various exemplary embodiments thereof. Although certain embodiments of the invention are specifically described herein, one of ordinary skill in the art will readily recognize that the same principles are equally applicable to, and can be employed in other apparatuses and methods. Before explaining the disclosed embodiments of the present invention in detail, it is to be understood that the invention is not limited in its application to the details of any particular embodiment shown. The terminology used herein is for the purpose of description and not of limitation.

As used herein and in the appended claims, the singular forms "a", "an", and "the" include plural references unless the context dictates otherwise. The singular form of any class of the ingredients refers not only to one chemical species within that class, but also to a mixture of those chemical species. The terms "a" (or "an"), "one or more" and "at least one" may be used interchangeably herein. The terms "comprising", "including", and "having" may be used interchangeably. The term "include" should be interpreted as "include, but not limited to". The term "including" should be interpreted as "including, but not limited to".

As used throughout, ranges are used as shorthand for describing each and every value that is within the range. Any value within the range can be selected as the terminus of the range.

The term "about" when referring to a number means any number within a range of 10% of the number. For example, the phrase "about 2.0 wt. %" refers to a number between and including 1.800 wt. % and 2.200 wt. %.

Unless otherwise specified, all percentages and amounts expressed herein and elsewhere in the specification should be understood to refer to percentages by weight. The amounts given are based on the active weight of the material.

All references cited herein are hereby incorporated by reference in their entireties. In the event of a conflict in a definition in the present disclosure and that of a cited reference, the present disclosure controls.

Any member in a list of species that are used to exemplify or define a genus, may be mutually different from, or overlapping with, or a subset of, or equivalent to, or nearly the same as, or identical to, any other member of the list of species. Further, unless explicitly stated, such as when reciting a Markush group, the list of species that define or exemplify the genus is open, and it is given that other species may exist that define or exemplify the genus just as well as, or better than, any other species listed.

The devices of the present invention may be free or substantially free of a preservative. As used herein, the terms "substantially free of a preservative" may refer to a composition that contains water in an amount of less than 3.0 weight %, less than 1.0 weight %, less than 0.1 weight %, or about 0.05 weight %, or less.

As used herein, the terms "mask(s)"; "device(s)"; and "delivery system(s)" may be used interchangeably.

The masks of the present invention may comprise materials such as polymers, natural and synthetic wovens, nonwovens, foil, paper, rubber, and combinations thereof. The masks may be a single layer of material or a laminate of more than one layer. Generally, the masks of the present invention comprise a material, or combination of materials, that is/are substantially water impermeable. The material may be any type of polymer that meets the required flexural rigidity and is compatible with skin care actives, such as hyaluronic acid. The material may comprise a single polymer or a mixture of polymers.

Preferably, the mask has rounded edges. "Rounded edges" as used herein means not having any sharp angles or points. The deformable/flexible substrate is preferably of a size that fits a human face. The size of the mask may depend on the size of the user's face.

In some embodiments, the mask comprises a surface having shallow pockets. When a composition is applied to the surface having shallow pockets, the composition may fill the shallow pockets to provide reservoirs for controlled/delayed release of an active ingredient. In further embodiments, the shallow pockets help to provide a texture to the delivery system. The device will preferably have an array of shallow pockets. Generally, the shallow pockets are approximately 0.4 mm across and 0.1 mm deep.

Flexural stiffness is a material property that is a function of a combination of mask thickness, width, and material modulus of elasticity. This test is a method for measuring the rigidity of a film and sheeting. It determines the resistance to flexure of a sample by using a strain gauge affixed to the end of a horizontal beam. The opposite end of the beam presses across a strip of the sample to force a portion of the strip into a vertical groove in a horizontal platform upon which the sample rests. A microammeter, wired to the strain gauge is calibrated in grams of deflection force. The rigidity of the sample is read directly from the microammeter and expressed as grams per centimeter of sample strip width.

In the present invention, the mask/device has a flexural stiffness of less than about 5 grams/cm as measured on a Handle-O-Meter, model #211-300, available from Thwing-Albert Instrument Co. of Philadelphia, Pa., as per test method ASTM D2923-95. Preferably, the mask/device has a flexural stiffness less than about 4 grams/cm, more preferably less than about 3 grams/cm, and most preferably from about 0.1 grams/cm to about 1 grams/cm. Preferably, the flexural stiffness of the mask/device is substantially constant and does not significantly change during normal use.

This relatively low stiffness enables the mask/device to drape over the contoured surfaces of a human face with very little force being exerted; that is, conformity to the curvature of the wearer's face is maintained because there is little residual force within the mask/device to cause it to return to its substantially flat shape. This flexibility also enables the mask/device to contact the skin of a human subject over an extended period of time without irritation. In addition, the mask/device does not require excessive pressure forming it against the skin.

In some embodiments, the mask/device is held in place without the need for an adhesive. In other embodiments, the mask/device is held in place by a composition comprising an active ingredient which is applied to a surface of the mask/device. In further embodiments, the viscosity and general tackiness of the materials that comprise the flexible substrate cause the mask/device to be adhesively attached to a skin surface of a human subject without substantial slippage under the potential friction from facial movement associated with talking, drinking, etc. However, this adhesion is low enough to allow the delivery system to be easily removed by the wearer by peeling off the mask/delivery system using one's fingers. In some embodiments, the mask/device is easily removable from the facial surface without the use of an instrument, a chemical solvent, or undue friction. Chemical solvents include any organic solvents commonly used in personal care products such as alcohol and other safe solvents such as water, which could be used to dilute the gelling agent. Undue friction is described as any type of rubbing with one's finger or a soft implement, such as cotton balls, swabs, or gauze pads.

A peel force of from about 1 gram to about 50 grams is all that is required. Preferably, the peel force is from about 5 grams to about 40 grams and more preferably from about 10 grams to about 30 grams. The low peel force is desired for consumer handling purposes. The low peel force is possible because of the surprising ability of the masks/devices of the present invention to closely fit the contour of a human face. Only when the flexural stiffness of the mask/device is low can the adhesion also be low. The adhesion of a stiffer mask/device would have to be greater in order to prevent the mask/device from returning to a generally flat conformation and pulling away from the contoured surface of a human face.

Some embodiments of the present invention provide a delivery system comprising: a deformable substrate comprising: a hydrogel comprising: a polymeric component; and water; wherein the polymeric component and water are present in a ratio of from about 1:5 to about 1:1, optionally from about 1:4 to about 1:2, further optionally about 1:3. In some embodiments, the polymeric component comprises a polymer selected from: an acrylate polymer; a cellulosic polymer (e.g., hydroxypropyl methylcellulose, hydroxyethyl cellulose, or hydroxypropyl cellulose); poly alkyl vinyl ether-maleic acid copolymer (PVM/MA copolymer); polyvinyl alcohol; polyacrylic acid; a poloxamer; polyvinyl pyrrolidone-vinyl acetate copolymer (PVP/VA copolymer); polyvinyl pyrrolidone; Polyquaterium-11; Polyquaterium-39; a carbomer; gelatin; an alginate salt (e.g., sodium alginate); and a combination of two or more thereof.

In some embodiments, the deformable substrate comprises a paper, a nonwoven fabric, a woven fabric, or a combination thereof. In some embodiments, the deformable substrate comprises a natural fibers such as pulp, cotton, linen, bamboo, kenaf, silk and wool; a regenerated fibers such as viscose rayon, cupra and lyocell; and or a synthetic fiber such as polyethylene fibers, polypropylene fibers, polyethylene terephthalate fibers, polybutyrene terephthalate fibers, nylon fibers and polyacrylic fibers. Two or more kinds of fibers may be mixed and used.

In other embodiments, the deformable substrate comprises a polymer. In some embodiments, the deformable substrate may comprise a water-soluble polymer, a water-swellable polymer, a water-insoluble polymer, or the combination thereof. In some embodiments, the polymer includes, but is not limited to: polyoxyethylene (PEO); Amylopectin; Hydroxypropyl emthylcellulose (HPMC); Hydroxyethyl-cellulose (HEC); hydroxypropyl cellulose (HPC); polyvinylpyrrolidone; carboxymethyl cellulose; polyvinyl alcohol; sodium alginate; polyethylene glycol; xanthan gum; tragacanth; guar gum; gum Arabic; polyacrylic acid; methylmethacrylate copolymer; a carboxy vinyl copolymer; starch; gelatin and combinations thereof.

In some embodiments, the polymer includes, but is not limited to: ethyl cellulose, cellulose ethyl hydroxypropyl ether, cellulose acetate pthalate (CAP), hydroxypropyl methylcellulose phthalate (HPMCP) and combinations thereof.

In some embodiments, the deformable/flexible substrate comprises a polymer selected from: a polysaccharide; a silicone; and a combination thereof.

In some embodiments, the deformable/flexible substrate comprises a polymer having a low glass temperature (e.g., a glass temperature between −70 and −10, in particular −55 and −25° C.). Polymers having the above-mentioned low glass temperatures are known for example from U.S. Pat. Nos. 2,973,282 and 3,307,544.

In some embodiments, the delivery systems of the present invention adhere to the human skin merely on contact. However, the deformable/flexible substrate should comprise a polymer or combination of polymers configured to adhere to the skin such that it may be peeled off without leaving any residue or damaging or irritating the skin.

In some embodiments, the polymer is a copolymer comprising acrylic and methacrylic acid esters of alcohols having 2 to 12, in particular 4 to 8 carbon atoms which may have a large number of other comonomers polymerized therein, for example (meth)acrylic acid, (meth)acrylic nitrile, (meth) acrylic amide, N-tert.-butyl-(meth-)acrylic amide, vinyl esters such as vinyl acetate, propionate or butyrate, other vinyl compounds such as styrene, further butadiene. The polymers may be crosslinked by adding minor amounts of comonomers having 2 or more copolymerizable double bonds, i.e. for example of diacrylates such as butane diol diacrylate, or divinyl compounds such as divinyl benzene, or by adding other crosslinkers, for example melamine formaldehyde resins. As sticky polymers, also polyisobutylenes and polyvinyl ethers with different molecular masses may be used.

In some embodiments, the deformable substrate has a proximal side and a distal side.

As used herein, "proximal side of the deformable substrate" refers to the side of the deformable substrate that is applied to the skin surface of a subject. As used herein, "distal side of the deformable substrate" refers to the side of the deformable substrate that is opposite to the side of the deformable substrate that is applied to the skin surface of a subject. In some embodiments, the proximal side of the deformable substrate is hydrophobic.

In certain embodiments, the deformable substrate is configured to deliver an active ingredient to a skin surface. In some embodiments, the active ingredient is selected from: a dermal filler; a neuromodulator; a cooling agent; an antimicrobial agent; an anti-inflammatory agent; an anti-aging compound; a biological material; and a combination of two or more thereof.

In some embodiments, the active ingredient is selected from: niacinamide; resveratrol; coenzyme-Q10; quercetin; and a combination of two or more thereof.

In some embodiments, the cooling agent comprises a TRPM8 receptor modulator, for example, a cooling agent described in U.S. Pat. No. 8,927,605. In some embodiments, the cooling agent is selected from: menthol, or a derivative thereof. In some embodiments, the cooling agent is selected from: menthol; cucumber; mint; wintergreen; aloe; yogurt; methyl diisopropyl propionamide; pentylene glycol; menthyl lactate; *Mentha haplocalix* extract; *Orbignya oleifera* seed oil; *Cocos nucifera* oil; *Mangifera indica* seed butter; *Elaeis guineensis* oil; *Lawsonia inermis* extract; *Eucalyptus globulus* leaf oil; *Mauritia flexuosa* flower/fruit extract; *Chlorella vulgaris* extract; algae extract; a cyclic α-keto enamine; menthone glycerin acetal; and a combination of two or more thereof. In other embodiments, the delivery system of the present invention comprises a cooling system comprising one or more cooling agents described in U.S. Pat. No. 9,198,840.

In other embodiments, the cooling agent is selected from: CAS #77341-67-4; CAS #59259-38-0; CAS #39711-79-0; CAS #51115-67-4; CAS #77341-67-4; and a combination of two or more thereof.

In further embodiments, the deformable substrate is substantially dry.

In some embodiments, the deformable substrate further comprises a plurality of reservoirs. In other embodiments, the reservoirs comprise an active ingredient.

Further embodiments provide a device further comprising a backing layer. While other embodiments of the present invention provide a device further comprising a protective layer.

In some embodiments, the deformable substrate is a multi-piece substrate. In certain embodiments, the multi-piece substrate comprises from about 2 to about 4 pieces. In some embodiments, the multi-piece substrate comprises 2 pieces.

In some embodiments, the device or delivery systems described herein, further comprise a fragrance. In some embodiments, the fragrance is incorporated in the deformable substrate.

In further embodiments, the fragrance comprises, based on total fragrance weight, a fragrance raw material comprising:

a) compound comprising a thiol moiety selected from the group consisting of 5-methyl-5-sulfanylhexan-3-one; 2-(4-methyl-1-cyclohex-3-enyl)propane-2-thiol; 5-methyl-2-(2-sulfanylpropan-2-yl)cyclohexan-1-one; 4,7,7-trimethyl-6-thiabicyclo[3.2.1]octane; 4-methoxy-2-methylbutane-2-thiol; methanethiol; Ethanethiol; prop-2-ene-1-thiol; propane-2-thiol; 2-methylpropane-2-thiol; propane-1-thiol; butane-2-thiol; butane-1-thiol; 2-methylpropane-1-thiol; methyldisulfanylmethane; 2-methylbutane-2-thiol; 3-methylbutane-2-thiol; 3-methylbutane-2-thiol; pentane-2-thiol; pentane-1-thiol; 2-methylbutane-1-thiol; cyclopentanethiol; 3-methyldisulfanylprop-1-ene; methylsulfanyldisulfanylmethane; 1-methyldisulfanylpropane; ethane-1,2-dithiol; 1-(methyldisulfanyl)prop-1-ene; 3-sulfanylbutan-2-one; ethyldisulfanylethane; hexane-1-thiol; 1-ethyldisulfanylpropane; thiophene-2-thiol; propane-1,3-dithiol; 3-sulfanylpentan-2-one; 2-propan-2-yldisulfanylpropane; butane-1,4-dithiol; benzenethiol; ethylsulfanyldisulfanylethane; 3-methylsulfanyldisulfanylprop-1-ene; 1-methylsulfanyldisulfanylpropane; butane-2,3-dithiol; 4-methyl-4-sulfanylpentan-2-one; 3-prop-2-enyldisulfanylprop-1-ene; 1-methoxyhexane-3-thiol; ethyl 2-sulfanylpropanoate; 1-(prop-2-enyldisulfanyl)propane; 1-propyldisulfanylpropane; 1-(4-hydroxy-3-methoxyphenyl)ethanone butane-1,3-dithiol; 1-propyldisulfanylprop-1-ene; 2-methylbenzenethiol; thiophen-2-ylmethanethiol; 3-sulfanylbutan-2-ol; phenylmethanethiol pentane-1,5-dithiol; 2-ethylbenzenethiol; 3-prop-2-enylsulfanyldisulfanylprop-1-ene; methyldisulfanyldisulfanylmethane; 1-propylsulfanyldisulfanylpropane; 2,7,7-trimethylbicyclo[3.1.1] heptane-2-thiol; 2,6-dimethylbenzenethiol; 2-phenylethanethiol; hexane-1,6-dithiol; 2-(methyldisulfanylmethyl)furan; pyridin-2-ylmethanethiol; 2-methoxybenzenethiol; (7,7-dimethyl-2-bicyclo[3.1.1]heptanyl)methanethiol; methyldisulfanylbenzene; 1-butyldisulfanylbutane; (4-methoxyphenyl)methanethiol; 2-sulfanylpropanoic acid; ethyl 2-methyldisulfanylpropanoate; (2E)-3,7-dimethylocta-2,6-diene-1-thiol; 3,7-dimethylocta-2,6-diene-1-thiol; pyrazin-2-ylmethanethiol; methyldisulfanylmethylbenzene; 2-methyl-5-(1-sulfanylpropan-2-yl)cyclohexane-1-thiol; octane-1,8-dithiol; 2-pyrazin-2-ylethanethiol; naphthalene-2-thiol; 2-oxo-3-sulfanylpropanoic acid; 2-thiophen-2-yldisulfanylthiophene; cyclohexyldisulfanylcyclohexane; 2-(furan-2-ylmethyldisulfanylmethyl)furan; phenyldisulfanylbenzene; benzyldisulfanylmethylbenzene; 8-Hydroxy-5-quinolinesulfonic acid; bis(3-methylbutyl) 2-sulfanylbutanedioate; 2-aminoethanesulfonic acid; 2-phenyl-3H-benzimidazole-5-sulfonic acid; 2-methyl-2-sulfanylpentan-1-ol; and mixtures thereof;

b) a compound comprising a sulfide moiety selected from the group consisting of 1-butylsulfanylbutane; ethyl 3-methylsulfanylpropanoate; 2-(methylsulfanylmethyl)furan; methylsulfanylmethane; methylsulfanylethane; 3-methylsulfanylprop-1-ene; S-methyl ethanethioate; ethylsulfanylethane; 1-methylsulfanylpropane; S-ethyl ethanethioate; 1-methylsulfanylbutane; 2-propan-2-ylsulfanylpropane; bis(methylsulfanyl)methane; 1-ethylsulfanylpropane; thiolane; 1-propylsulfanylpropane; 1-ethylsulfanylbutane; S-ethyl propanethioate; S-methylbutanethioate; S-methyl 3-methylbutanethioate; 3-methylsulfanylpropanal; 3-prop-2-enylsulfanylprop-1-ene; methyl 2-methylsulfanylacetate; S-prop-2-enyl propanethioate; 1-methylsulfanylbutan-2-one; 4-methylsulfanylbutan-2-one; 3-methylsulfanylpropan-1-am; 2,4,6-trimethyl-1,3,5-trithiane; 3-methylsulfanylbutanal; 2-methyl-1,3-thiazolidine; 2-methyl-4,5-dihydro-1,3-thiazole; ethyl 2-methylsulfanylacetate; methyl 3-methylsulfanylpropanoate; S-propan-2-yl 3-methylbutanethioate; 4-methyl-4-methylsulfanylpentan-2-one; 2-methyl-1,3-dithiolane; methyl 2-methylsulfanylbutanoate; S-methyl furan-2-carbothioate; S-propan-2-yl 3-methylbut-2-enethioate; thiolan-3-one; 3,5-diethyl-1,2,4-trithiolane; methylsulfanylmethylbenzene; 3-methylsulfanylpropan-1-ol; 2-(propan-2-ylsulfanylmethyl)furan; 2-methyl-5-methylsulfanylfuran; S-(furan-2-ylmethyl) methanethioate; 1,2,4-trithiolane; 2-methylthiolan-3-one; 4-methyl sulfanylbutan-1-ol; S-butan-2-yl 3-methylbutanethioate; S-butan-2-yl 3-methylbut-2-enethioate; S-(furan-2-ylmethyl)ethanethioate; 2-propyl-1,3-thiazolidine; 3-methyl-1,1-bis(methyl sulfanyl)butane; 3-ethylsulfanylpropan-1-ol; S-methyl benzenecarbothioate; 3,5-dimethyl-1,2,4-trithiolane; S-butan-2-yl 2-methylbutanethioate; methylsulfanylbenzene; 1-pentylsulfanylpentane; (2R,4S)-2-methyl-4-propyl-1,3-oxathiane; 2-methyl-4-propyl-1,3-oxathiane; ethyl 2-methyl-2-methylsulfanylpropanoate; S-(furan-2-ylmethyl) propanethioate; 4,7,7-trimethyl-6-thiabicyclo[3.2.1]octane; 3-methyl-1,2,4-trithiane; methylsulfanylmethyl hexanoate; 1-(4,5-dihydro-1,3-thiazol-2-yl)ethanone; 3-methylsulfanylpropanoic acid; 5-methylsulfanyl-2-(methylsulfanylmethyl)pent-2-enal; 4,5-dimethyl-2-(2-methylpropyl)-2,5-dihydro-1,3-thiazole; 3-methylsulfanylhexan-1-ol; 2-methyl-4,5-dihydrofuran-3-thiol acetate; 4-(3-oxobutylsulfanyl)butan-2-one; 3-methylsulfanylbutanoic acid; 2-methylsulfanylpyrazine; 2-methyl-3-methylsulfanylpyrazine; 2-(furan-2-ylmethylsulfanylmethyl)furan; 2-(methylsulfanylmethyl)pyrazine; 3,5-di(propan-2-yl)-1,2,4-trithiolane; 2-methylsulfanylphenol; 2-methyl-3-methylsulfanylpyrazine; ethyl 3-(furan-2-ylmethylsulfanyl)propanoate; 2,2,4,4,6,6-hexamethyl-1,3,5-trithiane; 2-methyl-5,7-dihydrothieno[3,4-d]pyrimidine; 2-amino-4-methylsulfanylbutanoic acid; (2S)-2-amino-4-methylsulfanylbutanoic acid; 2',3a-dimethylspiro[6,6a-dihydro-5H-[1,3]dithiolo[4,5-b]furan-2,3'-oxolane]; 2,5-dimethyl-1,4-dithiane-2,5-diol; Methyl 2-thiofuroate and mixtures thereof;

c) a compound comprising a thiazole moiety selected from the group consisting of 2-(2-methylpropyl)-1,3-thiazole; 2-(4-methyl-1,3-thiazol-5-yl)ethanol; 4-methyl-2-propan-2-yl-1,3-thiazole; 1-(1,3-thiazol-2-yl)ethanone; 2,4,5-Trimethylthiazole; 2-isopropyl-4-methylthiazole; 4-vinyl-5-methylthiazole; 2,4-Dimethyl-5-acetylthiazole 1,3-thiazole; 4-methyl-1,3-thiazole; 2,4-dimethyl-1,3-thiazole; 4,5-dimethyl-1,3-thiazole; 2,5-dimethyl-1,3-thiazole; 5-ethenyl-4-methyl-1,3-thiazole; 2-ethyl-4-methyl-1,3-thiazole; 4-ethyl-2-methyl-1,3-thiazole; 2-propyl-1,3-thiazole; 2,4,5-trimethyl-1,3-thiazole; 2-ethyl-1,3-thiazole; 2-ethoxy-1,3-thiazole; 2-butan-2-yl-1,3-thiazole; 5-methoxy-2-methyl-1,3-thiazole; 2-ethyl-4,5-dimethyl-1,3-thiazole; 1,3-benzothiazole; 2,5-diethyl-4-methyl-1,3-thiazole; 1-(1,3-thiazol-2-yl)propan-1-one; 4,5-dimethyl-2-(2-methylpropyl)-1,3-thiazole; 2-methyl-1,3-benzothiazole; 1-(2,4-dimethyl-1,3-thiazol-5-yl)ethanone; 4-methyl-2-propan-2-yl-1,3-thiazole; and mixtures thereof;

d) a compound comprising a pyrazine moiety selected from the group consisting of 2-methoxy-3-(2-methylpropyl)pyrazine; 2,3-dimethylpyrazine; 1-pyrazin-2-ylethanone; 2-methyl-3-methylsulfanylpyrazine; Pyrazine; 2-methylpyrazine; 2-ethenylpyrazine; 2-ethylpyrazine; 2,6-dimethylpyrazine; 2,5-dimethylpyrazine; 2-prop-1-en-2-ylpyrazine; 2-propan-2-ylpyrazine; 2-methoxypyrazine; 2-ethenyl-5-methylpyrazine; 2-ethyl-5-methylpyrazine; 2-Ethyl-6-methylpyrazine; 2-Ethyl-3-Methyl-Pyrazine; 2-propylpyrazine; 2,3,5-trimethylpyrazine; 2-tert-butylpyrazine; pyrazin-2-amine; 2-(2-methylpropyl)pyrazine; 2-methyl-5-propan-2-ylpyrazine; 2-(methoxymethyl)pyrazine; 2,3-diethylpyrazine; 2-ethyl-3,(5 OR 6)-dimethylpyrazine; 2-ethyl-3,5-dimethylpyrazine; 3-ethyl-2,5-dimethylpyrazine; 3-ethyl-2,5-dimethylpyrazine; 2-ethyl-3,5-dimethylpyrazine; 2-methyl-3-propylpyrazine; 2,3,5,6-tetramethylpyrazine; 7-methyl-6,7-dihydro-5H-cyclopenta[b]pyrazine; 2-methylsulfanylpyrazine; 2-methyl-3-methylsulfanylpyrazine; 2-ethoxy-3-ethylpyrazine; 2-Isobutyl-3-methylpyrazine; pyrazin-2-ylmethanethiol; 3,5-dimethyl-2-propylpyrazine; 2-ethyl-3-methoxypyrazine; 2-ethoxy-3-methylpyrazine; 2-ethyl-5-methoxypyrazine; 5,6,7,8-tetrahydroquinoxaline; 2-ethoxy-3-propan-2-ylpyrazine; 2-(methylsulfanylmethyl)pyrazine; 3,5-dimethyl-2-(2-methylpropyl)pyrazine; 2,3-diethyl-5-methylpyrazine; 3,5-Diethyl-2-methylpyrazine; 2,5-dimethyl-3-(2-methylpropyl)pyrazine; 2-methyl-6-propoxypyrazine; 2-(2-methylpropoxy)pyrazine; 1-(3-methylpyrazin-2-yl)ethanone; 2-methyl-3-methylsulfanylpyrazine; 2-methoxy-3-propan-2-ylpyrazine; quinoxaline; 3-butyl-2,5-dimethylpyrazine; 2-butyl-3,5-dimethylpyrazine; 2-pyrazin-2-ylethanethiol; 1-(3-ethylpyrazin-2-yl)ethanone; 1-(3,5-dimethylpyrazin-2-yl)ethanone; 2-butan-2-yl-3- methoxypyrazine; 2-methylquinoxaline; 5-Methylquinoxaline; 2-methoxy-3-(4-methylpentyl) pyrazine; 2,3-dimethylquinoxaline; 2-(cyclohexylmethyl)pyrazine; 2-[(furan-2-ylmethyl)sulfanyl]-5-methylpyrazine and mixtures thereof;

e) a compound comprising a nitrile moiety selected from the group consisting of 3,7-dimethyloct-6-enenitrile, 3-(4-ethylphenyl)-2,2-dimethylpropanenitrile; and mixtures thereof;

f) a compound comprising an indole moiety selected from the group consisting of 1H-indole, 3-methyl-1H-indole; and mixtures thereof;

g) a compound comprising an oxathiane moiety selected from the group consisting of (2R,4S)-2-methyl-4-propyl-1,3-oxathiane, 2-methyl-4-propyl-1,3-oxathiane, 2-pentyl-4-propyl-1,3-oxathiane; and mixtures thereof;

h) a compound comprising an oxime moiety selected from the group consisting of (NE)-N-[(6E)-2,4,4,7-tetramethylnona-6,8-dien-3-ylidene]hydroxylamine; N-(5-methylheptan-3-ylidene)hydroxylamine, and mixtures thereof; and/or i) a compound comprising an amine moiety selected from the group consisting of methyl 2-aminobenzoate, pentane-1,5-diamine; 6-methyl-7-Oxa-1-thia-4-azaspiro [4.4]nonane; and mixtures thereof;

In certain embodiments, the biological material comprises platelet-rich plasma; growth factors; and a combination thereof.

In some embodiments, the delivery system contains less than about 0.2 wt. % of a preservative, optionally less than 0.1 wt. %, further optionally about 0.05 wt. %. In some embodiments, the preservative system is paraben free.

In further embodiments, the backing layer is releasably attached to the deformable substrate. In other embodiments, the protective layer is releasably attached to the deformable substrate.

In certain embodiments, a surface of the deformable substrate comprises one or more protrusions. In some embodiments, the proximal surface of the deformable substrate comprises one or more protrusions. In some embodiments, the protrusions are from about 0.25 mm to about 3 mm in length, optionally from about 1 mm to about 2 mm, or about 1.25 mm to about 1.75 mm, or about 1.5 mm in length. In some embodiments, the protrusions comprise a material suitable for use in personal care or aesthetic procedures. In further embodiments, the protrusions comprise stainless steel.

In some embodiments, the cooling agent and/or fragrance may be referred to as a sensorial agent or ingredient. In some embodiments, the sensorial agent or ingredient is delivered at the same time as the active ingredient to provide a cooling effect and a therapeutic effect simultaneously.

In some embodiments, the deformable substrate further comprises a matrix. In certain embodiments, an active ingredient is contained with the matrix. In some embodiments, the matrix comprises a polymer. In further embodiments, the matrix is configured to control the release of the active ingredient. In some embodiments the active ingredient is solubilized in a polymer solution to form a homogeneous mixture. In other embodiments, the active ingredient is insoluble in the polymer solution and forms a suspension or dispersion. In either case, the active ingredient is at least partially incorporated into the matrix. As the matrix degrades over time, the active ingredient is released from the matrix, preferably at a controlled rate. The release of the active ingredient from the matrix may be varied, for example, by the solubility or heat sensitivity of the active ingredient, the distribution of the agent within the matrix, the size, shape, porosity, solubility and biodegradability of the matrix, and the like. In other embodiments, the active ingredient is released after exposure to moisture, heat, vibration, light, an abrasive, or a combination thereof.

Still further embodiments of the present invention provide a mask for delivery of an ingredient to a facial surface of a mammalian subject comprising: a flexible substrate comprising a non-woven material; an ingredient selected from: a filler; a neuromodulator; a cooling agent; an antimicrobial agent; an anti-inflammatory agent; an anti-aging compound; a biological material (e.g. platelet-rich plasma or growth factors); and a combination of two or more thereof; wherein the flexible substrate has at least one hydrophobic surface. Yet other embodiments of the present invention provide a mask wherein the flexible substrate has a proximal side and a distal side; and wherein the proximal side is hydrophobic.

In some embodiments, the anti-inflammatory agent is selected from: ascorbic acid (Vit C); tocopherol (Vit. E); ginger root; green tea (EGCG); vitamin D; curcumin; a cannabinoid; aloe; witch hazel; colloidal oatmeal; and a combination of two or more thereof.

In some embodiments, the flexible substrate is configured to retain liquid on at least one of its surfaces. In some embodiments, the flexible substrate is configured to retain up to about 10 mL of liquid on one of its surfaces, optionally up to about 9 mL, up to about 8 mL, up to about 7 mL, up to about 6 mL, up to about 5 mL, up to about 4 mL, up to about 3 mL, up to about 2 mL, or up to about 1 mL.

In some embodiments, the flexible/deformable substrate comprises two major surfaces. In some embodiments, the first major surface is a proximal surface and the second major surface is the distal surface.

Further embodiments of the present invention provide a method of treating a skin surface, comprising: applying a delivery system comprising: a backing layer; a protective layer; and a deformable substrate comprising: a hydrogel comprising: a polymeric component; and water; wherein the polymeric component and water are present in a ratio of from about 1:5 to about 1:1, optionally from about 1:4 to about 1:2, further optionally at about 1:3, to a skin surface of a mammal in need thereof.

In some embodiments, the delivery system is applied after a dermatological procedure. In other embodiments, the dermatological procedure is an ablative or non-ablative procedure. In certain embodiments, the ablative or non-ablative procedure is a facial procedure. In further embodiments, the dermatological procedure is selected from: a facial; a chemical peel; microdermabrasion; ablative laser resurfacing (e.g., with CO2 or erbium); non-ablative laser resurfacing (e.g., photo rejuvenation or pulsed dye laser); micro-needling; ultrasound; cryotherapy; radiofrequency; injection or topical application of regenerative cells; injection with neuromodulators or fillers; and a combination of two or more thereof.

In some embodiments, the dermatological procedure is an injectable procedure. In other embodiments, the injectable procedure comprises administration of a dermal filler and/or a neuromodulator. In certain embodiments, dermal filler is selected from: collagen; calcium hydroxyapatite (CaHA); hyaluronic acid (HA); autologous fat; poly-L-lactic acid; polymethylmethacrylate (PMMA); and a combination of two or more thereof. In some embodiments, the neuromodulator is selected from: onabotulinumtoxinA (Botox®); incobotulinumtoxinA (Xeomin®); and abobotulinumtoxinA (Dysport®).

In other embodiments, the active ingredient is selected from: platelet-rich plasma; growth factors; an exosome, stem cells, a stem cell serum, a secretome, an anti-aging topical composition (e.g., a cream, lotion or gel); a mineral; a vitamin; and a combination of two or more thereof.

In some embodiments, the protective layer is removed prior to application of the delivery system to the skin surface. In other embodiments, the backing layer is removed after application of the delivery system to the skin surface. In further embodiments, removal of the backing layer provides a cooling effect to the skin surface. Still further embodiments of the present invention provide methods wherein treating includes a reduction in redness, pain and/or swelling.

In some embodiments, the deformable substrate has a peel strength sufficient to maintain the delivery system in substantially the same place it was applied for from about 15 seconds to about 60 minutes. In other embodiments, the deformable substrate has a peel strength sufficient to maintain the delivery system in substantially the same place it was applied for from about 15 seconds to about 45 minutes. In other embodiments, the deformable substrate has a peel strength sufficient to maintain the delivery system in substantially the same place it was applied for from about 15 seconds to about 30 minutes. In other embodiments, the deformable substrate has a peel strength sufficient to maintain the delivery system in substantially the same place it was applied for from about 30 seconds to about 15 minutes. Other embodiments of the present invention provide methods wherein the delivery system is maintained in substantially the same place it was applied for about 5 minutes, optionally for about 6, about 7, about 8, about 9, about 10, about 11, about 12, about 13, about 14, about 15, about 16, about 17, about 18, about 19, about 20, about 21, about 22, about 23, about 24, about 25, about 26, about 27, about 28, about 29 or about 30 minutes.

Still further embodiments provide methods wherein the deformable substrate has a peel strength sufficient to maintain the delivery system in substantially the same place during an ordinary mammalian activity. While other embodiments of the present invention provide methods wherein the mammalian activity is selected from: walking; jogging; sleeping; eating; drinking; speaking; blinking; and a combination of two or more thereof.

In some embodiments, the delivery system is readily conformable, without permanent deformation, to the shape of a mammal's face.

In some embodiments, the delivery system is substantially free of tenting after it is applied to the skin surface of the mammal. In certain embodiments, the delivery system is configured to adhere to the facial contours of the mammalian subject without application of significant force.

As used herein, "tenting" refers to lifting of the delivery system from the skin, or loss of contact with between the delivery system and the skin, during use.

In some embodiments, the deformable substrates described herein further comprise a scrim. In some embodiments, the scrim comprises a non-woven fiber. In other embodiments, the scrim comprises a fibrillary network. Still further embodiments provide a delivery system wherein the fibrillary network comprises a fiber density effective to provide sufficient rigidity to the delivery system. Still further embodiments provide a delivery system wherein the fibrillary network comprises a fiber density effective to provide suitable flexibility to the delivery system.

The following examples further describe and demonstrate illustrative embodiments within the scope of the present invention. The examples are given solely for illustration and are not to be construed as limitations of this invention as many variations are possible without departing from the spirit and scope thereof. Various modifications of the invention in addition to those shown and described herein should be apparent to those skilled in the art and are intended to fall within the appended claims.

EXAMPLES

Example 1

Described in Tables 1-3 (below) are exemplary delivery systems (Ex. I-III) of the present invention; and comparative delivery systems (Comp. Ex. I-VIII). Also described in Tables 1-3 are the results from observational studies on the adherence, and cooling provided, by these exemplary and comparative delivery systems.

TABLE 1

| Ingredient | Ex. I | Comp. Ex. I | Ex. II | Ex. III |
|---|---|---|---|---|
| | Wt. % | | | |
| Water | 68-70 | 88 | 80 | 75 |
| Polymer Component | 26.25 | 11.45 | 19.45 | 24.45 |
| Arnica | 0.5 | 0.1 | 0.1 | 0.1 |
| Green Tea | 0.5 | 0.1 | 0.1 | 0.1 |
| Vitamin E | 0.5 | 0.1 | 0.1 | 0.1 |
| Chamomile | 0.5 | 0.1 | 0.1 | 0.1 |
| Hyaluronic Acid | 0.75 | 0.1 | 0.1 | 0.1 |
| Preservative | 3 | 0.05 | 0.05 | 0.05 |
| RELEASE LINER (mil) | 2 | 3 | 3 | 3 |
| TOP LINER (mil) | 1 | 2 | 2 | 2 |
| Deformable Substrate (mil) | 0.32 | 0.55 | 0.4 | 0.37 |
| SCRIM | Non-woven | Non-woven | Non-woven | Non-woven |
| Cooling | Pass | Pass | Pass | Pass |
| Adherence | Pass | Fail | Pass | Pass |

TABLE 2

| Ingredients | Comp. Ex. II | Comp. Ex. III | Comp. Ex. IV | Comp. Ex. V |
|---|---|---|---|---|
| | Wt. % | | | |
| Water | 90 | 90 | 90 | 87.02 |
| Polymer Component | 10 | 10 | 10 | 10 |
| Arnica | — | 0.75 | 0.5 | 0.5 |
| Green Tea | — | 0.5 | 0.75 | 0.75 |
| Vitamin E | — | 0.5 | 0.5 | 0.5 |
| Chamomile | — | 0.5 | 0.5 | 0.5 |
| Hyaluronic Acid | — | 0.5 | 0.5 | 0.5 |
| Preservative | — | — | — | 0.23 |
| Additional Features | | | | |
| RELEASE LINER (mil) | 3 | 1 | 1 | n/a |
| TOP LINER (mil) | 2 | 2 | 2 | 1 |
| Mask (mil) | 0.55 | | 0.5 | 0.5 |
| SCRIM | Non-woven | Non-woven | Woven | Non-woven |
| Cooling | Pass | Pass | Pass | Pass |
| Adherence | Fail | Fail | Fail | Fail |

TABLE 3

| Ingredient | Comp. Ex. VI | Comp. Ex. VII | Comp. Ex. VIII |
|---|---|---|---|
| | Wt. % | | |
| Water | — | — | 50 |
| Polymer Component | — | — | 5.5 |
| Adhesive | 788 | 235a | — |
| Backing | 3M Scothchpak ™ 9733 Backing Polyester Film Laminate | 3M Scothchpak ™ 9733 Backing Polyester Film Laminate | — |
| Release Liner | 3M Scotchpak ™ 9744 Release Liner Fluropolymer Coated Polyester Film | 3M Scotchpak ™ 9744 Release Liner Fluropolymer Coated Polyester Film | — |
| Arnica | — | — | X |
| Hyaluronic Acid | — | — | X |
| Lidocaine | X | X | — |
| Wintergreen | X | X | — |
| Menthol | X | X | — |
| Collagen | X | X | — |
| Tea Tree | X | X | — |
| Vitamin E | X | X | — |
| Honey | X | X | — |
| Rosemary | X | X | — |
| Additional Features | | | |
| RELEASE LINER (mil) | — | — | 3 |
| TOP LINER (mil) | — | — | 1.5 |
| Mask (mil) | — | — | 0.55 |
| SCRIM | n/a | n/a | Non-woven |
| Cooling | Fail | Fail | Fail |
| Adherence | Fail | Fail | Fail |

Example 2: Split Face Study

Controlled medical grade cryogen therapy at −78° C., followed by micro-needling was performed on the face of a 55-year old female Caucasian subject with moderate sun damage. Treatment was applied from the hairline to jaw line while taking care to avoid the eyes nostrils and lips. Following treatment, the skin was gently cleansed with cool water and the hydrogel mask was applied to the right side of the face only (treated side). The untreated side was exposed to air and no further treatment was applied. The patient was instructed to keep applying the post treatment mask to the right half of the face only at least twice daily for 30 minutes at a time, while not treating the left side whatsoever. High-resolution images were taken before the procedure and again on days 1, 3 and 5 post treatment. The patient was asked to rate the PAIN, REDNESS and PEELING of the treated side vs. the untreated side.

A 5-point Likert scale was used to describe the level of PAIN, REDNESS and PEELING with 1 being very minor, 2 being mild, 3 being moderate, 4 being moderate to severe and 5 being extremely severe. The results are described in Table 4 (below).

TABLE 4

| | Split Face | | | | | |
|---|---|---|---|---|---|---|
| | Pain | | Redness | | Peeling | |
| | Treated | Untreated | Treated | Untreated | Treated | Untreated |
| Immediate | 2 | 5 | 3 | 5 | n/a | n/a |
| Day 1 | 1 | 4 | 2 | 5 | 3 | 4 |
| Day 3 | 1 | 4 | 1 | 5 | 2 | 5 |
| Day 5 | 1 | 3 | 1 | 4 | 1 | 5 |

Figure 1B:
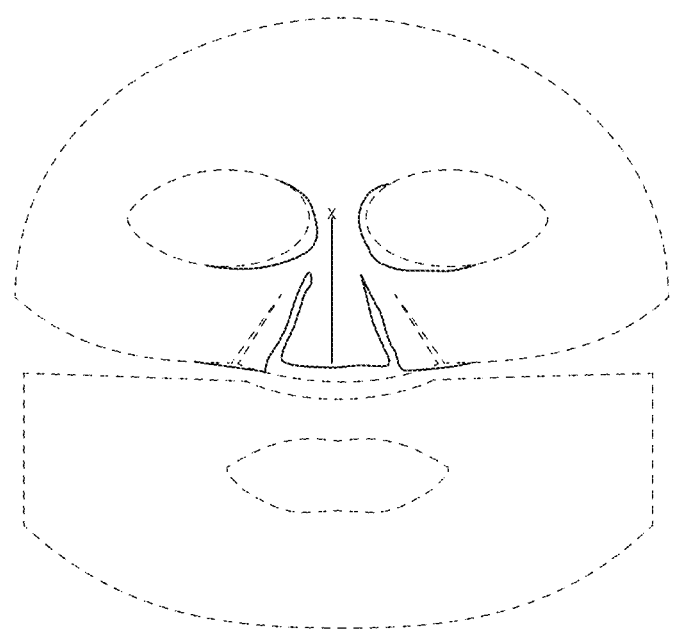
Figure 2:
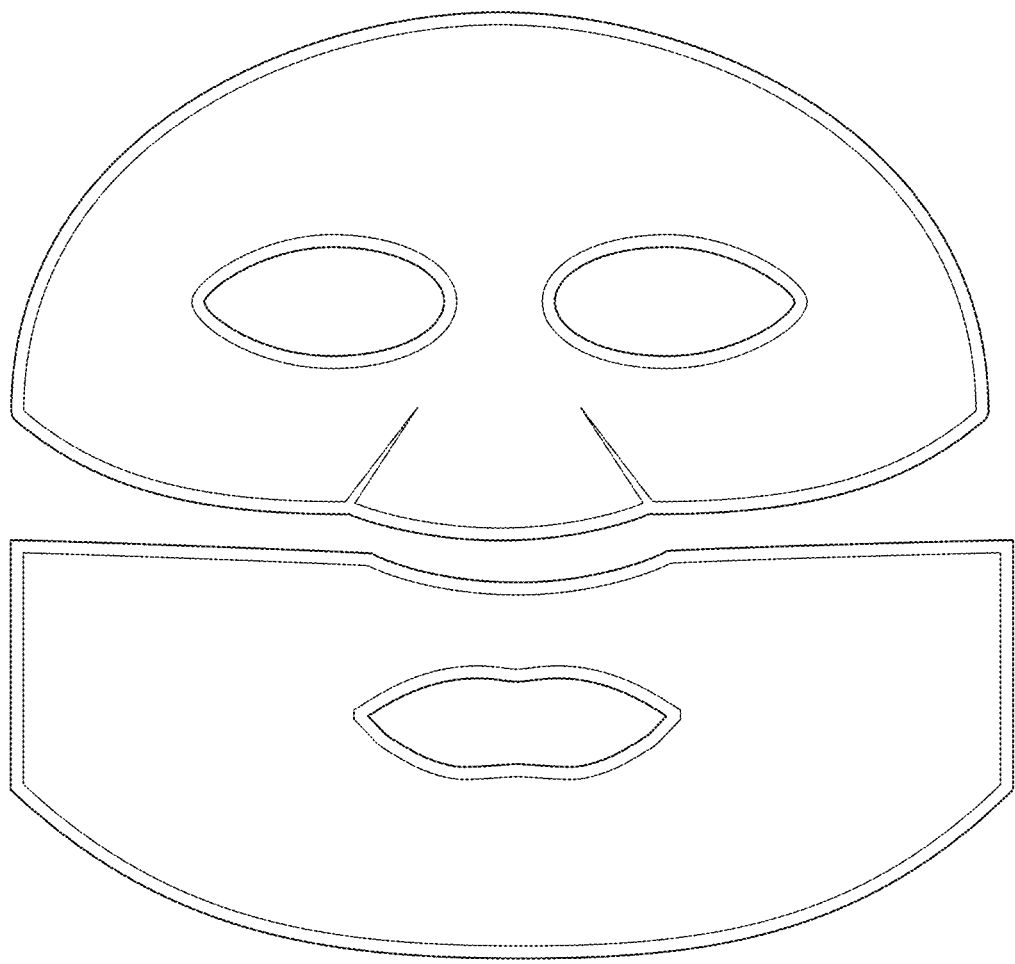
FIG. 2 depicts another exemplary delivery system of the present invention.
Figure 3:
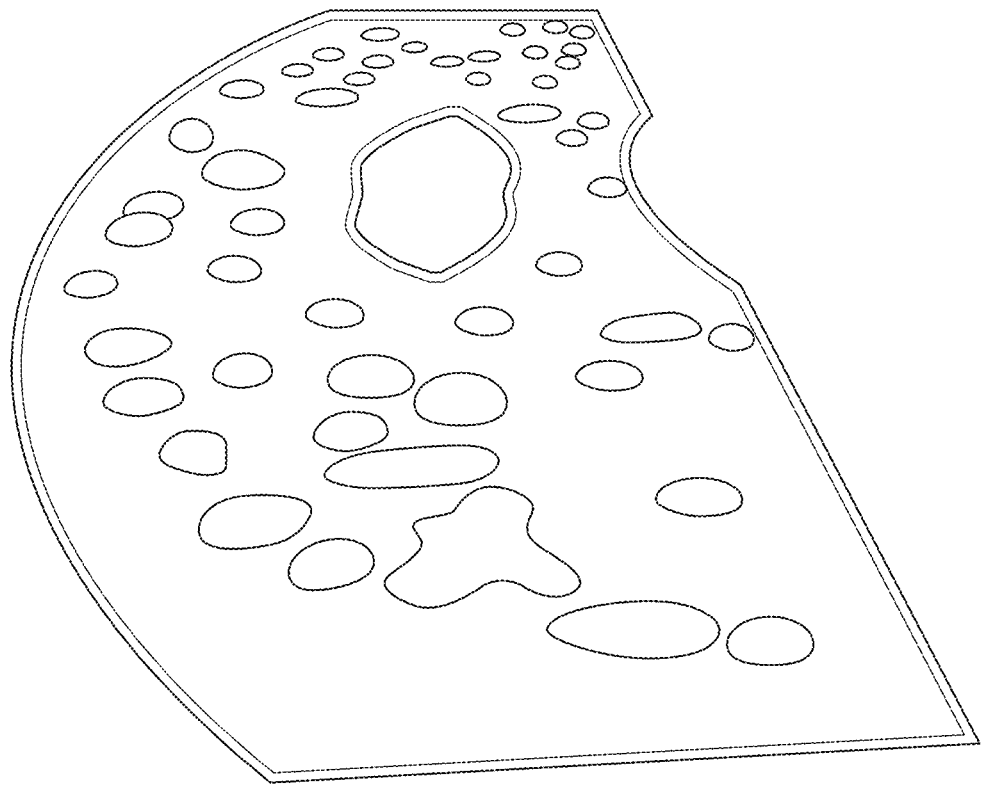
FIG. 3 depicts the ability of an exemplary delivery system of the present invention to retain a volume of liquid on a surface of a deformable/flexible substrate.

Subjective and objective evaluation immediately after treatment, following the first application of the hydrating mask demonstrated a pronounced positive aesthetic. Redness and heat retention (FIG. 1) are reduced as perceived by the naked eye and thermal imagery respectively.

Figure 4:
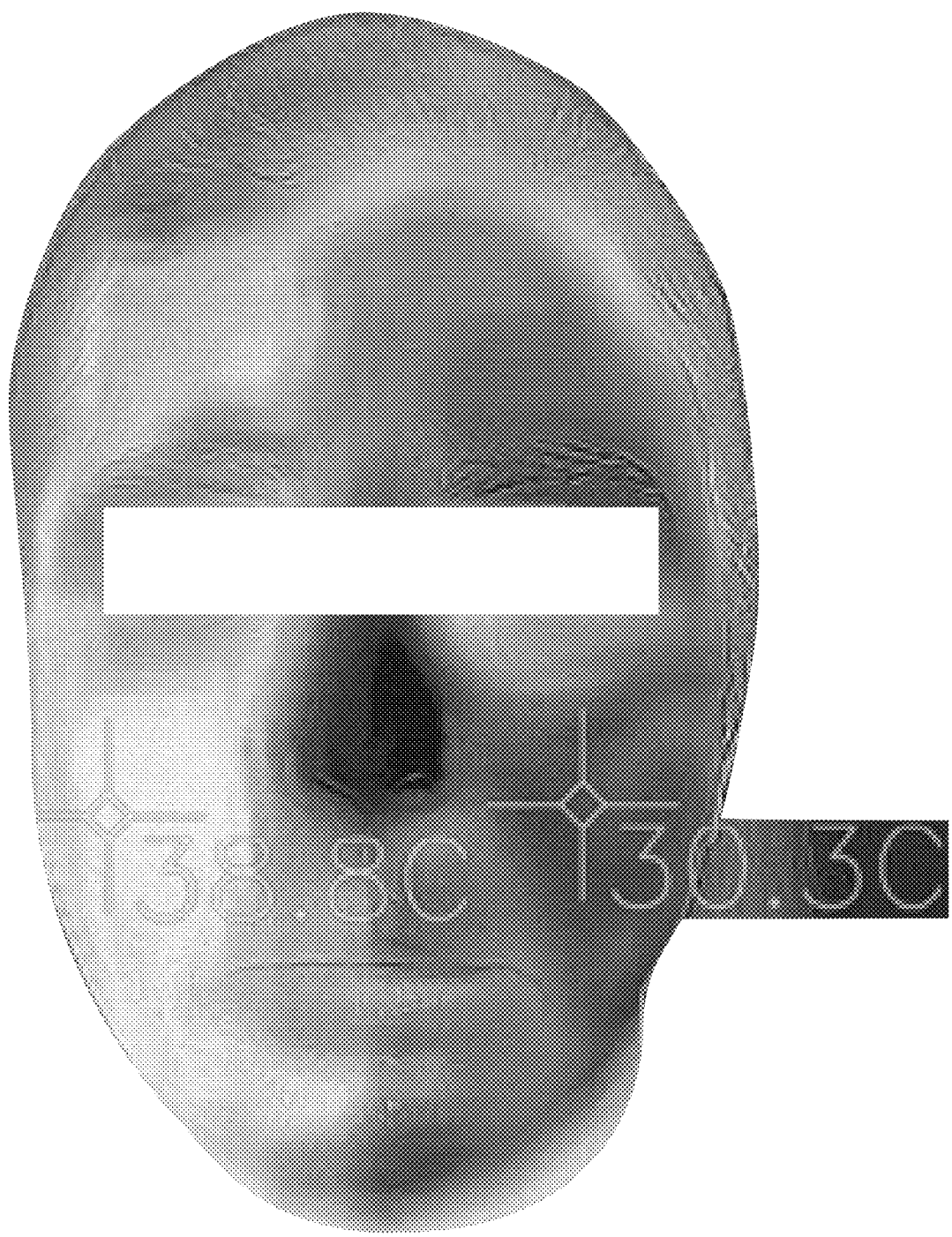
FIG. 4 depicts thermal images of a human subject after a facial aesthetic procedure (treated v. untreated), which illustrates the degree of cooling provided by an exemplary delivery system of the present invention.
Figure 5A:
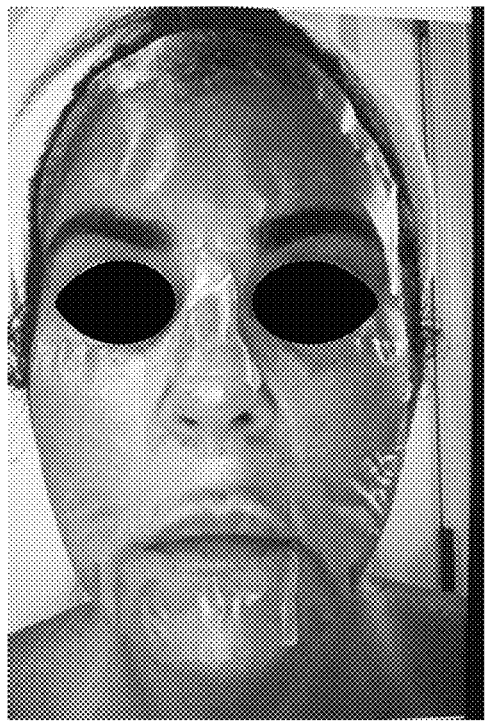
FIG. 5A depicts the striated or ripple-like tenting and poor adhesion of a comparative delivery system.
Figure 5B:
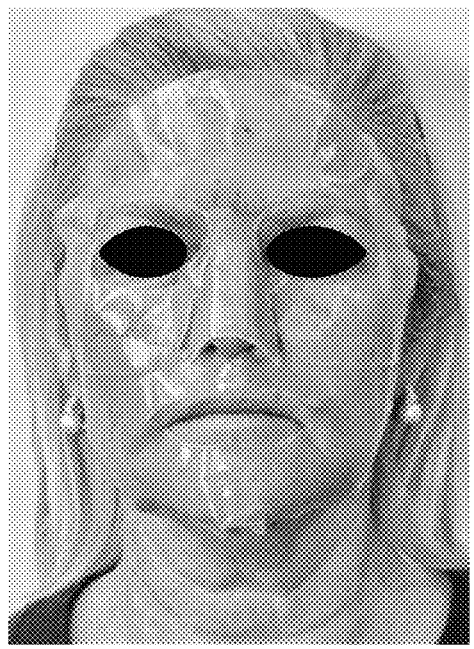
FIG. 5B depicts a human subject after application of an exemplary delivery system of the present invention, wherein the exemplary delivery system is substantially free of tenting.

Assessment according to the Likert scale demonstrates an interesting pattern up to 5 days post procedure. Table 4 and FIG. 4 include data from the assessment. In all cases pain or discomfort resolved completely 24 hours post treatment. This may be related to the initiative shown at the most critical point, immediately following treatment, and the continued 'at home' practice. Redness was more persistent than pain, which was completely resolved between 24 to 72 hours post treatment, contrasting with persistent redness throughout the five days without the use of masks, only attenuating slightly on the fifth day. As expected, peeling in the 'no mask' group increased during the five days. It is therefore serendipitous that the treatments prevented most of the peeling from occurring, resolving completely by the fifth day.

Example 3: Assessment of Pain Following Micro-Needling Procedure

Five female subjects underwent facial micro-needling at a depth of 1.5 mm. The procedure resulted in some pin-point bleeding and local redness.

Immediately following the procedure subjects were asked to grade the level of pain on a 5-point Likert scale with 1 being very minor pain, 2 being mild pain, 3 being moderate pain, 4 being moderate to severe pain and 5 being extremely severe pain. Following this initial assessment (PRE), an exemplary delivery system of the present invention (e.g., a hydrogel mask) was applied to the face and the subject was asked to rate pain on the same scale, at 1 minute and 5 minutes, following application of the mask.

The results are described below in Table 5.

TABLE 5

| | Pre/Post Treatment | | | | |
|---|---|---|---|---|---|
| | Pain | | | | |
| | Subject 1 | Subject 2 | Subject 3 | Subject 4 | Subject 5 |
| Pre | 5 | 4 | 4 | 5 | 4 |
| Post (1 min) | 2 | 1 | 1 | 2 | 2 |
| Post (5 mins) | 1 | 1 | 1 | 1 | 1 |

Subjective and objective evaluation immediately after treatment, following the application of the hydrating mask demonstrated a pronounced positive aesthetic. Redness and heat retention are reduced as perceived by the naked eye.

Assessment according to the Likert scale demonstrates that all five candidates perceived significant changes to pain with application of the mask. Pain is barely felt after 5 minutes of applying the mask. The normal clinical outcome includes tenderness, discomfort and pain for several days post procedure.

Because the first few hours following treatment are considered most critical in achieving a desirable long-term aesthetic outcome, hydration with purified water, in the absence of extraneous ingredients that risk granuloma formation, is a recommended initiative. Not only is the candidate protected against undesirable side effects of treatment, but the candidate is rewarded with a reassuring self-portrait, i.e., if the candidate witnesses less redness, experiences less pain and discomfort they will feel reassured of the success of the treatment.

Unfortunately, micro-needling is associated with pain and discomfort. Thereafter redness to the face can make the candidate uncomfortable about their physical appearance. The current case study demonstrates that advanced moisturization post-procedure has a significant effect on the short-term dermal phenotype and the quality of the experience. Thus, by providing candidates with an improved post procedural experience, the use of moderately invasive procedures in aesthetic dermatology is likely to grow. The perception that it is safe and convenient is a necessary milestone.

Example 4

Microdermabrasion and micro-needling focused on areas between the hairline and jaw line, avoiding the eyes, nostrils and lips. Part A: Following microdermabrasion, the skin was gently cleansed with cool water and an exemplary delivery system according to some embodiments of the present invention (e.g., a hydrogel mask) was applied to the right side of the face only (treated side). The untreated side was exposed to air and no further treatment was applied. After 15 minutes, the mask was removed, and the erythema, irritation, swelling, warmth, and pain of the treated side verses the untreated side were assessed and classified according to a 10-point Likert scale, with 1 being very minor, and 10 being extremely severe. Part B: Following micro-needling the active side of an exemplary delivery system according to some embodiments of the present invention (e.g., a hydrogel mask) was coated in platelet-rich plasma and applied to the whole face of the candidate for 15 mins. The candidates were assessed using the same 10-point Likert scale.

Subjective and objective evaluation immediately after treatment, following the first application of the hydrating mask demonstrated a pronounced positive aesthetic. When candidates were assessed according to the Likert scale (see Table 6, below) all five post-procedural side effects were significantly attenuated, contrasting with the non-masked side of the face. This outcome is evident from the half-face mask procedure, which contrasts between mask and no mask. On average the negative effects were reduced to 31% for erythema, 45% for irritation, 84% for swelling, 35% for warmth and 52% for pain. The average overall is a reduction to 49.8% of side-effects from the procedure. A more pronounced outcome was achieved in Part B of the study (see Table 7, below), which is a full-face masking treatment, and although the procedures between part A and B were not identical, some idea of side effects without masking can be garnished from inspection of Table 6 (below).

TABLE 6

Half Face Mask

| Treatment | Erythema | Irritation | Swelling | Warmth | Pain |
|---|---|---|---|---|---|
| Female #1 | 2/10 vs. 7/10 | 3/10 vs. 7/10 | 5/10 vs. 6/10 | 2/10 vs. 5/10 | 3/10 vs. 5/10 |
| Female #2 | 3/10 vs. 8/10 | 3/10 vs. 7/10 | 4/10 vs. 5/10 | 1/10 vs. 6/10 | 3/10 vs. 5/10 |
| Female #3 | 2/10 vs. 5/10 | 3/10 vs. 7/10 | 5/10 vs. 5/10 | 2/10 vs. 6/10 | 2/10 vs. 5/10 |
| Female #4 | 2/10 vs. 7/10 | 3/10 vs. 6/10 | 4/10 vs. 5/10 | 2/10 vs. 4/10 | 2/10 vs. 5/10 |
| Female #5 | 2/10 vs. 8/10 | 3/10 vs. 6/10 | 4/10 vs. 5/10 | 2/10 vs. 5/10 | 3/10 vs. 5/10 |
| | Avg. 2.2 vs. 7.0 | Avg. 3.0 vs. 6.6 | Avg. 4.4 vs. 5.2 | Avg. 1.8 vs. 5.2 | Avg. 2.6 vs. 5.0 |

Female #1: (right-face mask vs left no mask) 15 min of mask application
Female #2: (right-face mask vs left no mask) 15 min of mask application
Female #3: (right-face mask vs left no mask) 15 min of mask application
Female #4: (right-face mask vs left no mask) 15 min of mask application
Female #5: (right-face mask vs left no mask) 15 min of mask application

TABLE 7

Total Face Mask

| Treatment | Erythema | Irritation | Swelling | Warmth | Pain |
|---|---|---|---|---|---|
| Male #1 | 2/10 | 2/10 | 3/10 | 3/10 | 1/10 |
| Female #2 | 3/10 | 2/10 | 4/10 | 2/10 | 2/10 |
| Female #3 | 2/10 | 2/10 | 6/10 | 3/10 | 2/10 |
| | Avg. 2.3/10 | Avg. 2.0/10 | Avg. 4.3/10 | Avg. 2.6/10 | Avg. 1.6/10 |

Male #1: 15 min of mask application Microneedling RF + PRP for Acne Scars
Female #2: 15 min of mask application Microneedling RF + PRP Acne Scars
Female #3: 15 min of mask application Microneedling RF + PRP Rhytids and Skin Rejuvenation Studies have demonstrated that the clinical outcome of microdermabrasion and micro-needling is dependent upon post procedural steps. Because the first few hours following treatment are considered most critical in achieving a desirable long-term aesthetic outcome, hydration with purified water, in the absence of extraneous ingredients that risk granuloma formation, is a recommended initiative. Other forms of hydration masking have been used and reported in the published literature, such as the use of premium waters to reduce symptoms following facial laser procedures. However, in the current study the hydrating mask is intended to be constituted of ultra-pure water, because the objective is to avoid introducing exogenous substances. Reducing symptomatic reactions to superficial dermal procedures confers a buffering effect against the oxidation by-products that accumulate from inflammatory processes. Furthermore, the changed gene expression profile, and keratinocyte-fibroblast crosstalk, is most fluent when reactive oxygen species are quenched, limited or circulated off-site. Reducing inflammation is therefore, critical to optimizing the efficacy of treatments. Micro-injury generally stimulates the expression of transforming growth factor beta (TGF-beta) isotypes, which elicit different gene expression events in the presence of reactive oxygen species that promote fibroses development10, causing scars. Hence, the masking step optimizes the gene expression events associated with TGF-beta. In part B of the current study, the use of platelet-rich plasma as a moisturizing layer on the contact surface of an exemplary post-procedural mask of the present invention, constitutes a highly unique approach to the use of platelet-rich plasma. By maintaining the moisture content of the platelet-rich plasma, its penetration into the micro-pores generated from micro-needling is greatly enhanced. Furthermore, the secretion of growth factors is improved if the surface remains moist or hydrated. Hence, by providing candidates with an improved post procedural experience, the use of moderately invasive procedures in aesthetic dermatology is likely to become more common. The perception that it is safe and convenient is a necessary milestone. Importantly, the clinical outcome of the procedure is likely to be better if secondary effects are minimized.

The post treatment 'in office' hydrating mask dramatically attenuated the discomfort and clinical manifestation of inflammation within a short timeframe (15 mins) for both part A and B procedures. It is expected that the positive effects derived from the mask initiative will reassure the patient of the procedure's success and furthermore, accommodate an improved long-term outcome. It is known that a post-procedural strategy, to reduce signs and symptoms of discomfort, influences the quality of life of the patient.

The data described in the foregoing examples, demonstrates that post treatment with an exemplary delivery system of the present invention provides a simple to use, quick and effective discomfort relief option to patients in office as well as for continued use at home over days following office based dermatological procedures.

While the present invention has been described with reference to several embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention is to be determined from the claims appended hereto. Further, it will be apparent to those of skill in the art that numerous changes may be made in such details without departing from the spirit and the principles of the invention.

What is claimed is:

1. A facial mask comprising:
   an active ingredient; and
   a deformable substrate having a proximal side and a distal side, comprising:
      a hydrogel comprising:
         a polymeric component; and
         water;
      wherein the hydrogel has a hydrophobic surface;
      wherein all of the active ingredient is present on said hydrophobic surface;
      wherein the active ingredient is selected from: platelet-rich plasma; growth factors; an exosome, stem cells; a secretome; and a combination of two or more thereof; and
   wherein the polymeric component and water are present in a ratio of from about 1:5 to about 1:1.

2. The facial mask according to claim 1, wherein the polymeric component comprises a polymer selected from: an acrylate polymer; a cellulosic polymer; poly alkyl vinyl ether-maleic acid copolymer; polyvinyl alcohol; polyacrylic acid; a poloxamer; polyvinyl pyrrolidone-vinyl acetate copolymer; polyvinyl pyrrolidone; polyquaternium-11; polyquaternium-39; a carbomer; gelatin; an alginate salt; and a combination of two or more thereof.

3. The facial mask according to claim 1, wherein the proximal side of the deformable substrate is hydrophobic.

4. The facial mask according to claim 1, further comprising a backing layer and/or a protective layer.

5. The facial mask according to claim 1, wherein the deformable substrate is a multi-piece substrate.

6. The facial mask according to claim 1, further comprising a scrim comprising a non-woven fiber; and wherein the scrim comprises a fibrillary network having a fiber density effective to provide sufficient rigidity to the facial mask.

7. A method of treating a skin surface, comprising:
   applying a delivery system according to claim 1, to a skin surface of a mammal in need thereof.

8. The method according to claim 7, wherein the deformable substrate is configured to retain up to about 10 ml of liquid on the hydrophobic surface.

9. The method according to claim 7, wherein the delivery system is applied after a dermatological procedure selected from: a facial; a chemical peel; microdermabrasion; ablative laser resurfacing; non-ablative resurfacing; micro-needling; ultrasound; cryotherapy; radiofrequency; and a combination of two or more thereof.

10. The method according to claim 9, wherein the dermatological procedure is an injectable procedure comprising administration of a dermal filler selected from: collagen; calcium hydroxyapatite (CaHA); hyaluronic acid (HA); autologous fat; poly-L-lactic acid; polymethylmethacrylate (PMMA); and a combination of two or more thereof; a neuromodulator selected from: onabotulinumtoxin A; incobotulinumtoxin A; and abobotulinumtoxin A, or regenerative cells selected from: platelet-rich plasma; growth factors; an exosome, stem cells; a stem cell serum; a secretome; a stomal vascular fraction; an anti-aging topical composition; a mineral; a vitamin; and a combination of two or more thereof.

11. The method according to claim 7, wherein the backing layer is removed after application of the delivery system to the skin surface; and wherein removal of the backing layer provides a cooling effect to the skin surface.

12. The method according to claim 7, wherein the delivery system is substantially free of tenting after it is applied to the skin surface of the mammal.

13. The facial mask according to claim 1, wherein the facial mask is held in place without an adhesive.

* * * * *